(12) United States Patent
Yajnik et al.

(10) Patent No.: US 12,333,375 B2
(45) Date of Patent: *Jun. 17, 2025

(54) ACCESSING APPLICATION CONTENT AND FEATURES USING DEEP LINKING WITH WIRELESS PROTOCOLS OR SCANNABLE CODES

(71) Applicant: Capital One Services, LLC, McLean, VA (US)

(72) Inventors: Sanjiv Yajnik, McLean, VA (US); Satyajit Sajanrao Nalavade, McKinney, TX (US); Sunil Raste, Plano, TX (US); Eddie Provencio, Coppell, TX (US); Vikramaditya Repaka, Coppell, TX (US); John Patrick Eckman, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,406

(22) Filed: Apr. 5, 2024

(65) Prior Publication Data
US 2025/0156659 A1   May 15, 2025

Related U.S. Application Data

(63) Continuation-in-part of application No. 18/506,679, filed on Nov. 10, 2023.

(60) Provisional application No. 63/548,785, filed on Feb. 1, 2024.

(51) Int. Cl.
 G06K 7/10   (2006.01)
 G06F 8/38   (2018.01)
 G06F 8/65   (2018.01)

(52) U.S. Cl.
 CPC ........... *G06K 7/10227* (2013.01); *G06F 8/38* (2013.01); *G06F 8/65* (2013.01)

(58) Field of Classification Search
 CPC .......... G06K 7/10227; G06F 8/38; G06F 8/65
 See application file for complete search history.

*Primary Examiner* — Matthew Mikels
(74) *Attorney, Agent, or Firm* — Foley & Lardner LLP

(57) ABSTRACT

Methods and systems disclosed herein enable accessing and updating content using deep linking. The system may generate a deep link for a user that links the user to an operator that requested generation of the deep link. The deep link may be encoded into a wirelessly detectable tag or a visually scannable code, which may be stored with user action data and an operator identifier. When a visually scannable code is scanned or a wirelessly detectable tag is accessed, the deep link is decoded and all data associated with the deep link is retrieve and generated for display, when needed. By generating deep links in combination with the visually scannable codes or wirelessly detectable tags, the system is able to provide quick and efficient data retrieval and update.

20 Claims, 10 Drawing Sheets

200

| Action Data 202 | Operator Identifier 204 |
|---|---|
| <Description> | <Identification Data> |

*FIG. 2*

| User Identifier 502 | Action Data 504 | Operator Identifier 506 | Visually Scannable Code 508 |
|---|---|---|---|
| <Identification Data for User 1> | <Identification Data For a First Action> | <Identification Data for Operator 1> |  |
| <Identification Data for User 1> | <Identification Data For a First Action> | <Identification Data for Operator 2> | 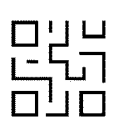 |
500
510 
512 
*FIG. 5*

| url_id | type_id | deep_link_data | created_by | created_for | created_datetime | expiration_datetime | passcode |
|---|---|---|---|---|---|---|---|
| 123456 | 1 | 123\|1234\|ABC123\|S123 | abc123 | 12345 | 5/31/2022 8:00am | 6/5/2022 5:00pm | 1234 |
| 789654 | 2 | ABCD-1234\|S123 | abc123 | | 5/31/2022 11:00am | | |

900

| type_id | deep_link_type_name | deep_link_metadata | base_url |
|---|---|---|---|
| 1 | vehicle offer | dealerId\|leadId\|vin\|customPrice\|SaleAgent | container.capitalone.com/offer |
| 2 | prequal | dealerId\|leadId\|SaleAgent | container.capitalone.com/prequal |

ACCESSING APPLICATION CONTENT AND FEATURES USING DEEP LINKING WITH WIRELESS PROTOCOLS OR SCANNABLE CODES

CROSS-REFERENCE TO RELATED APPLICATION(S)

This application is a continuation in part and claims the benefit of priority to U.S. patent application Ser. No. 18/506,679, filed Nov. 10, 2023. This application also claims priority to U.S. Provisional Application No. 63/548,785, filed Feb. 1, 2024. The content of the foregoing applications is incorporated herein in its entirety by reference.

BACKGROUND

In recent years, the use of visually scannable codes (e.g., quick-response (QR) codes) for various applications has exponentially increased. Visually scannable codes (e.g., QR codes) may be two-dimensional codes that may store a wide range of information, including textual information, graphical information, and/or other suitable information. Visually scannable codes may be easily generated and displayed using various media formats, such as print materials, digital screens, and packaging. Users may scan visually scannable codes using smartphones or dedicated scanners, which allows them to instantly access the associated information. Currently, these codes are used in various ways, for example, to exchange contact information.

Furthermore, use of deep links and deep linking technology, in general, has been increasing in recent years as well. Deep links enable better user experience by allowing direct access to portions of applications or webpages that would take time and effort for a user to reach. Deep linking is a flexible technology that may be combined with other technologies for a much better user experience. For example, combining deep linking with near field communication technology or visually scannable codes may lead to a user experience that enables efficient wireless access to portions of applications or websites that are difficult to access.

SUMMARY

In some instances, combining deep linking technologies and wireless communications technologies such as near field communication technologies and visually scannable codes enable generation of and access to computer code (e.g., interpretable code) that may be changed or updated without changing the deep link itself, but by changing the underlying parameters associated with the deep link. This combination also enables execution of the code without including any parameter information within the access request thereby making execution more secure. For example, the system may perform the following operations for generating and executing code (e.g., interpretable code) using deep link technology.

The system may receive a request to generate a deep link. For example, the system may receive the request from a mobile device of the operator to generate a deep link and embed that deep link into a near field communication tag or a visually scannable code such as a QR code. In some embodiments, the request may instruct the system to link the operator and the user with an action performed by the user in relation to the operator. Thus, the request may be for a near field communication payload and may include first action data describing a first action, a first operator identifier corresponding to the first operator, and a user identifier of the user. In some embodiments, the linking of the operator to the user may be performed through a deep link to computer code (e.g., interpretable code). In some embodiments, the interpretable code may be a webpage.

When the request is received, the system may generate interpretable code for linking the operator with the user and a deep link for accessing and updating the interpretable code. In particular, in response to the request, the system may generate interpretable code and a deep link for executing the interpretable code. The interpretable code may include a first operator identifier for a first operator and a user identifier for the user. Furthermore, once the deep link is generated, the deep link may be written into the wirelessly detectable tag or into a visually readable code such as a QR code. For example, the interpretable code may be a webpage that includes one or more tags storing an operator identifier, a user interface, and/or an action identifier. In some embodiments, the system may generate a database entry for the deep link. The system may then add a plurality of fields representing the deep link. In some embodiments, the plurality of fields may include an expiration timestamp for the deep link. Thus, when the deep link is received in a request to access the corresponding interpretable code, the system may determine whether the link has not expired yet. In particular, the system may, based on receiving the data access request including the deep link, determine, using the expiration timestamp, whether the deep link is still valid.

In some embodiments, when the deep link is generated, the deep link may be added to a wirelessly detectable tag (e.g., a near field communication tag). In particular, the system may encode the deep link into a near field communication payload and write the near field communication payload into the wirelessly detectable tag (e.g., a near field communication tag). In some embodiments, the system may perform the following operations when writing the deep link into the wirelessly detectable tag. The system may encode the deep link into a format compatible with near field communication protocol. In some embodiments, the wirelessly detectable tag may be a Bluetooth enabled device that may transmit presence data that includes the deep link. Thus, the system may encode the deep link into a Bluetooth compatible format. The system may then write the encoded deep link into a near field communication tag of an object. The object may be a physical object such as a card with an electronic chip. In another example, the object may be a digital object such as a digital card that may be transmitted between user devices such as smartphones.

As discussed above, the system may execute the interpretable code and update the interpretable code using the deep link. In particular, the system may detect an update request to the wirelessly detectable tag. The update request may include (1) one or more changes to the interpretable code and the deep link. The system may use the deep link to retrieve the interpretable code, update the interpretable code, and then save the updated interpretable code. In some embodiments, the update request may be a request to update the near field communication tag. Thus, the update request may include second action data describing a second action associated with the user, and a second operator identifier corresponding to a second operator. For example, the update request may be a request that links the second operator to the user by a particular action that the user performed in relation to the second operator.

In response to the update request, the system may generate updated interpretable code based on the one or more changes. The updated interpretable code may cause a user interface linking the user and the operator to be generated for display. In some embodiments the user interface may include a first action identifier of the first action, a second action identifier of the second action, the first operator identifier, the second operator identifier, and the user identifier.

In addition to updating the interpretable code, the system may enable execution of the interpretable code by accessing the deep link. Thus, the system may receive a data access request that includes the deep link. Based on receiving the data access request with the deep link, the system may execute the updated interpretable code associated with the deep link. In some embodiments, execution of the updated interpretable code may cause generation of a display that includes a first action identifier of the first action, a second action identifier of the second action, the first operator identifier, the second operator identifier, and the user identifier. In yet some embodiments, the system may generate for display a webpage as a result of execution of the interpretable code associated with the deep link. The system may also add one or more operator identifiers and the user identifier to the webpage. In particular, the system may generate a graphical user interface that enables the user to enter user data (e.g., a webpage form) and add, to code for the graphical user interface, a first identifier of the first operator and a second identifier of the second operator.

Furthermore, this disclosure describes visually scannable codes, such that visually scannable codes may be used to track training schedules and performance for elite athletes. For example, many athletes may have multiple trainers and/or coaches, and it may be difficult to track various activities during each training session with each coach. In some instances, a particular trainer may work with multiple athletes or clients and may desire to keep track of different activities during the training sessions. By using visually scannable codes, users are able to quickly and efficiently track progress with each operator. Accordingly, a mechanism is disclosed that would allow users to track and manage their individual actions with multiple operators in pursuit of a specific routine. One mechanism to allow users to track their routines includes utilizing visually scannable codes (e.g., QR codes) to track a combination of the user (e.g., an athlete), operator (e.g., a trainer), and one or more actions. As one example, methods and systems are described herein for tracking a user's training routines with multiple trainers. Various existing systems allow tracking of training routines. However, quick, efficient access to training data by multiple parties (e.g., multiple trainers and users) is often difficult. To overcome this and other issues, methods and systems disclosed herein enable tracking user actions by generating different visually scannable codes (e.g., QR codes) for combinations of user, operator, and action(s). Each visually scannable code may be stored with user action data and an operator identifier and linked to another visually scannable code corresponding to the user. By generating the visually scannable codes and storing the codes in this manner, the system is able to provide quick and efficient data retrieval for each party.

In some aspects, the problems described above may be solved using a tracking system that may perform the following operations. The tracking system may receive a first request to generate a first visually scannable code. In particular, the tracking system may receive a first request to generate a first visually scannable code encoding a first action associated with both a user and a first operator. The first request may include first action data describing the first action. For example, a first trainer may use his or her smartphone and may transmit a request, to the tracking system, to generate a QR code when an athlete performs an exercise routine with that trainer. The routine may have one or more actions.

The tracking system may generate a visually scannable code to represent the training routine that was performed. In particular, in response to the first request, the tracking system may generate the first visually scannable code and store the first action data, a first operator identifier of the first operator, and the first visually scannable code. The first visually scannable code may embed an identifier that enables retrieving the first action data and second action data associated with the user. For example, the tracking system may generate a first QR code after receiving the request from the trainer's computing device. The tracking system may store the routine data, a unique identifier for the first trainer, and the first QR code together in a database. The first QR code may include a user identifier for the athlete.

The tracking system may receive a second request to generate another visually scannable code for another training routine. In particular, the tracking system may receive a second request to generate a second visually scannable code representing a second action associated with both the user and a second operator. The second request may include the second action data describing the second action. For example, a second trainer may use his or her electronic tablet to transmit a request, to the tracking system, to generate a QR code when the athlete starts a routine with the second trainer.

The tracking system may generate the second visually scannable code. In particular, in response to the second request, the tracking system may generate the second visually scannable code and store the second action data, a second operator identifier of the second operator, and the second visually scannable code. The second visually scannable code may embed the identifier that enables retrieving the first action data and the second action data. For example, the tracking system may generate a second QR code after receiving the request from the second trainer. The tracking system may store the routine data, a unique identifier for the second trainer, and the second QR code together in a database. The second QR code may also include the same user identifier for the same athlete.

The tracking system may generate for display the first action data and the second action data. In particular, in response to determining that the first visually scannable code has been detected or the second visually scannable code has been detected, the tracking system may generate for display the first action data and the second action data. For example, a user device may display text or a graphic representing the first action and another text or graphic representing a second action when those actions are identified in response to scanning a QR code. In some embodiments, the athlete's smartphone may display an icon representing the first action and another icon representing the second action after scanning the QR code on a trainer's card or smartphone.

In some embodiments, the tracking system may link a plurality of visually scannable codes to the first visually scannable code. In particular, the tracking system may determine that the first action includes a plurality of sub-actions. Then, the tracking system may generate a corresponding visually scannable code for each sub-action of the plurality of sub-actions. Furthermore, the tracking system may link each corresponding visually scannable code to the first visually scannable code. For example, the tracking system may determine the first routine includes three exercises. The tracking system may then generate three QR codes. Each QR code corresponds to one exercise. After generating all three QR codes, the tracking system links the QR codes together to the first QR code using the user identifier.

In some embodiments, the tracking system may embed a link into the first visually scannable code. In particular, the tracking system may encode the first action data into a parameter string representing the first action, the first operator identifier, and a user identifier associated with the user. The tracking system may embed the parameter string into the first visually scannable code. For example, the first action data may refer to a name for the routine. The first operator identifier may refer to the name of the trainer. For example, the tracking system may assign an alphanumeric string to each trainer, athlete, and action. The user identifier may refer to the alphanumeric string associated with the athlete, another alphanumeric string for the trainer, and the third alphanumeric string for one or more actions. Therefore, the tracking system may generate a string adding three alphanumeric strings. Furthermore, the tracking system may generate a link (e.g., to an application) for the first QR code. The link may include the string enabling access to the application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure of a request to generate a visually scannable code, in accordance with one or more embodiments.

FIG. 5 illustrates a data structure used for flagging a visually scannable code, in accordance with one or more embodiments.

FIG. 9 illustrates portions of data structures for storing deep links and deep link types, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
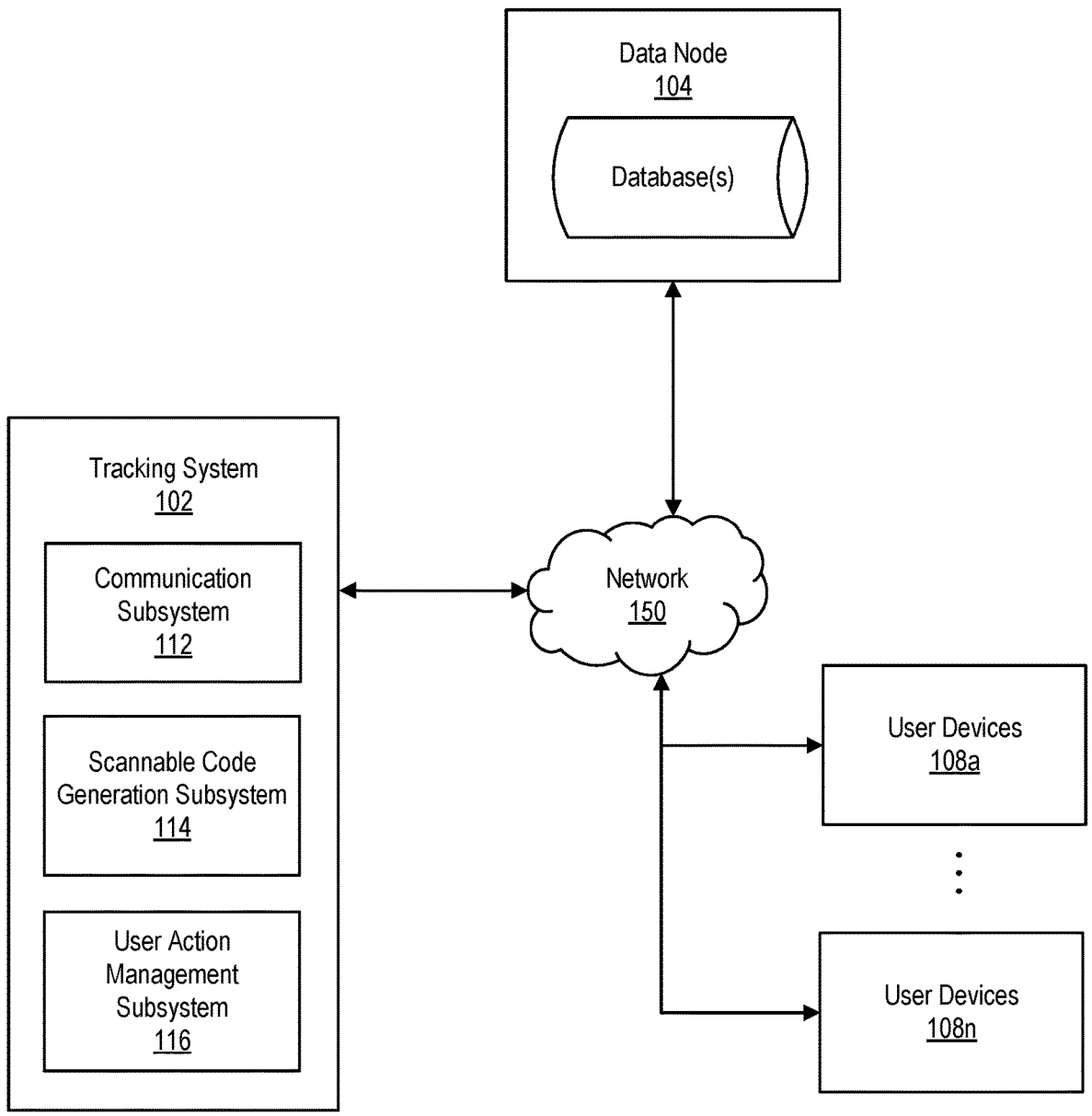
FIG. 1 shows an illustrative diagram for tracking user actions using visually scannable codes, in accordance with one or more embodiments.

FIG. 1 shows an example of an environment 100 for tracking user actions using visually scannable codes. Environment 100 includes tracking system 102, data node 104, and user devices 108a-108n. Tracking system 102 may execute instructions for tracking user actions using visually scannable codes. Tracking system 102 may include software, hardware, or a combination of the two. For example, tracking system 102 may be hosted on a physical server or a virtual server that is running on a physical computer system. In some embodiments, tracking system 102 may be configured on a user device (e.g., a laptop computer, a smartphone, a desktop computer, an electronic tablet, or another suitable user device).

Data node 104 may store various data, including action data, operator data, visually scannable codes, and/or other suitable data. Data node 104 may include software, hardware, or a combination of the two. For example, data node 104 may be a physical server or a virtual server that is running on a physical computer system. In some embodiments, tracking system 102 and data node 104 may reside on the same hardware and/or the same virtual server/computing device. Network 150 may be a local area network (LAN), a wide area network (WAN) such as the Internet, or a combination of the two.

User devices 108a-108n may include any suitable end-user computing devices (e.g., desktop computers, laptops, electronic tablets, smartphones, and/or other computing devices used by end users) capable of transmitting and receiving data such as requests and/or transactions.

Tracking system 102 may receive data from user devices 108a-108n using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may include a communication module (e.g., including hardware such as a network card and software to drive that network card). Communication subsystem 112 may receive and transmit data. For example, communication subsystem 112 may transmit a command to display the visually scannable code. In some embodiments, communication subsystem 112 may transmit a command to data node 104 to store the visually scannable codes. In some embodiments, the communication subsystem 112 may receive requests for generating visually scannable codes. In particular, communication subsystem 112 may receive a first request to generate a first visually scannable code encoding a first action associated with both a user and a first operator. The first request may include first action data describing the first action. In addition to using tracking system 102 to track training routines for athletes, in some embodiments, the system described herein may be used in a vehicle dealership (e.g., for selling cars, trucks, boats, and/or other vehicles) setting where service agents (e.g., operators) may perform tasks or actions related to users (customers). For example, tracking system 102 may receive a request from a service agent (e.g., operator) from his or her laptop or smartphone to generate a QR code in response to the service agent interacting with a customer. The interaction may include one or more actions such as showing the customer one or more vehicles within a dealership and/or taking the customer for a test drive in one or more vehicles. Components of the request are described further herein with references to FIG. 2. Although the tracking system and associated components are described herein in relation to tracking athletes' training routines or tracking customers of a vehicle dealership, the tracking system may be used in other settings to keep track of multiple operators interacting with multiple users.

In some embodiments, communication subsystem 112 may receive a first request to generate a first visually scannable code that encodes data related to the first operator. For example, communication subsystem 112 may receive a request to generate a QR code for the first operator. The QR code may be unique to the first operator and may identify the first operator. In some embodiments, the first visually scannable code may identify a user. For example, the first operator may request that a QR code is generated for the user. The QR code may be unique to the particular user and may identify that user. In yet some embodiments, the first visually scannable code may be generated for a pair of the first operator and the user. For example, a request may be instructing the system to generate a QR code that is unique to a pair that includes the first operator and the user.

FIG. 2 illustrates a data structure 200 of a request to generate a visually scannable code. Data structure 200 may include action data 202, and operator identifier 204. For example, the action data may refer to any data that describes the interaction between the service agent and the customer. For instance, the action may refer to a customer viewing a vehicle. The action data may refer to data such as the vehicle model the user viewed as well as user details such as their name and number. In some embodiments, action data may include multiple interactions such as the user both viewing and test driving the vehicle. Operator identifier 204 may include an identifier for the service agent's account. Therefore, tracking system 102 may receive a request from a user device to generate a QR code based on viewing a vehicle. As described herein, tracking system 102 may receive the request in a form of data structure 200, the data structure including action data 202 and operator identifier 204. In some embodiments, the request may be received from a user device (e.g., user device of user devices 108a-108n) via communication subsystem 112. Although FIG. 2 illustrates a data structure that includes action data, the visually scannable code may be generated for an operator. Accordingly, the data structure may include the visually scannable code, an operator identifier associated with a corresponding operator, and/or other data associated with the operator. In some embodiments, the visually scannable code may identify a user and thus, the data structure may include the visually scannable code, a user identifier, and/or other user data.

In some embodiments, the first request may include other information that may enable tracking system 102 to identify an operator associated with the request. In particular, the first request may include a first operator visually scannable code. Tracking system 102 may then determine a first operator identifier (e.g., an identifier associated with the first operator) using the first operator visually scannable code. For example, each service agent (e.g., operator) may be associated with a unique QR code. Each QR code may be unique to a corresponding service agent and may encode metadata information related to the agent's profile, dealership, and/or other relevant metadata. The QR code may be stored in a database and associated with the agent's profile. The agent's profile may include data associated with the agent such as sales information, action information, associated customers, and/or other suitable data. By storing and aggregating this information, tracking system 102 may be able to improve sales attribution accuracy by precisely identifying the service agent or service agents that contributed to each sale.

In some embodiments, scannable new codes may be generated using scannable code generation subsystem 114 that may include software components, hardware components, or a combination of both. For example, scannable code generation subsystem 114 may include software components that access and/or execute program instructions to generate scannable codes. For instance, scannable code generation subsystem 114 may include a QR code generator. Thus, scannable code generation subsystem 114 may generate a visually scannable code. In particular, in response to the first request, scannable code generation subsystem 114 may generate the first visually scannable code and store the first action data, a first operator identifier of the first operator, and the first visually scannable code. The first visually scannable code may embed an identifier that enables retrieving the first action data and second action data associated with the user. In some embodiments, the visually scannable code may be independent from the action data and may be associated with a first operator, the user, and/or with both.

In some embodiments, scannable code generation subsystem 114 may generate a QR code in response to the request received from the service agent. The QR code may include a link that enables displaying the first and second action data. In some embodiments, scannable code generation subsystem 114 may call an Application Programming Interface (API) to generate a unique QR code based on the service agent's information. The API (which may be A REST or Web services API) may provide a decoupled interface to data and/or functionality to the user device (e.g., a user device of user devices 108a-108n). The API may provide a common, language-agnostic way of interacting with any application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions. For example, the scannable code generation subsystem 114 may transmit customization parameters to the API to ensure the QR code is unique to each service agent. Communication subsystem 112 may pass at least a portion of the data included in the request, or a pointer to the data in memory, to scannable code generation subsystem 114. Components of the QR code are described further herein with references to FIG. 3. In some embodiments, the visually scannable code may be used to retrieve information related to the first operator, the user, and/or the combination of both.

Figure 3:
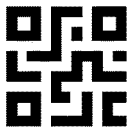
FIG. 3 illustrates a data structure for storing a visually scannable code, in accordance with one or more embodiments.

FIG. 3 illustrates a data structure 300 for storing visually scannable codes. Data structure 300 may include action data 302, operator identifier 304, and visually scannable code 306. For example, each time a service agent transmits a request to generate a QR code to store the customer interaction (e.g., an action indicating that a test drive was performed), scannable code generation subsystem 114 may generate and store a corresponding QR code. In some embodiments, action data 302 may include the same data as action data 202. For instance, the action data may refer to data such as the vehicle model the customer viewed as well as customer details such as customer's name, email address, phone number, etc. In some embodiments, operator identifier 304 may include the same data as operator identifier 204. For instance, the tracking system may determine that more than one service agent assisted the customer. Therefore, operator identifier 304 may store more than one operator identifier. In some embodiments, tracking system 102 may store data structure 300 on data node 104.

When more activities associated with a user (e.g., a customer) are performed by the same operator or other operators (e.g., services agents), tracking system 102 may receive another request or multiple requests to generate a second visually scannable (e.g., via code via the communication subsystem 112). In particular, tracking system 102 may receive a second request to generate a second visually scannable code representing a second action (e.g., action data 202) associated with both the user and a second operator. The second request may include the second action data describing the second action. For example, tracking system 102 may receive a second request to generate a new QR code for the customer and a service agent for a second action. For instance, the second action may refer to the customer coming into the dealership after the test drive (e.g., first action). The customer may be visiting to express interest in buying the same car that they took for a test drive or a different car. In another example, if a customer test drove multiple cars, the customer may be coming in to make a purchase or perform another action related to one of the cars. In response to speaking with the customer, the service agent may request to generate a new QR code. In some embodiments, the service agent for the first action may be the same service agent for the second action.

Tracking system 102 may then generate the second visually scannable code. In particular, in response to the second request, tracking system 102 may generate (e.g., using scannable code generation subsystem 114) the second visually scannable code (e.g., visually scannable code 306) and store the second action data (e.g., action data 302), a second operator identifier of the second operator (e.g., operator identifier 304), and the second visually scannable code (e.g., in a database on data node 104). The second visually scannable code may embed an identifier that enables retrieving the first action data and the second action data. For example, the second request may indicate that the customer is ready to purchase the vehicle within the related action data (e.g., action data 202). In response, the QR code generated (e.g., visually scannable code 306) may include a link to a pre-qualification website. The pre-qualification website may collect customer information and initiate the customer pre-qualification process. During the pre-qualification process, the system may generate a call to an API for creating a data structure representing the customer within the pre-qualification process. The customer data (e.g., action data 302), the service agent information (e.g., operator identifier 304), and the associated QR code from the second request may be passed to a customer relationship management (CRM) system. The service agent information may also flow to the CRM system, thereby attributing the creation action to the specific service agent.

Figure 4:
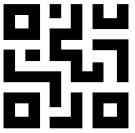
FIG. 4 illustrates a data structure of a database entry, in accordance with one or more embodiments.

In some embodiments, when storing the first action data, tracking system 102 may store the first action data in a first database entry. Components of the database entry are described further herein with references to FIG. 4. FIG. 4 illustrates a data structure 400 of a database entry. Data structure 400 may include user identifier 402, action data 404, operator identifier 406, and visually scannable code 408. In particular, tracking system 102 when storing the first action data (e.g., action data 302) may store the first action data (e.g., action data 404), the first operator identifier (e.g., operator identifier 406), and the first visually scannable code (e.g., visually scannable code 408) in a first database entry (e.g., data structure 400) corresponding to the user (e.g., user identifier 402). Likewise, tracking system 102 when storing the second action data (e.g., action data 202 or action data 302) may store the second action data (e.g., action data 404), the second operator identifier (e.g., operator identifier 406), and the second visually scannable code (e.g., visually scannable code 408) in a second database entry corresponding to the user. In some embodiments, tracking system 102 may link the first database entry and the second database entry. In particular, tracking system 102 may link the first database entry and the second database entry based on a user identifier associated with the user. For example, when storing the first and second actions in a database, tracking system 102 may generate a user identifier (e.g., user identifier 402). Therefore, when a visually scannable code is scanned, all entries associated with the user identifier (e.g., user identifier 402) corresponding to a scanned code may be retrieved.

When the visually scannable codes are scanned, data retrieval actions may be performed by user action management subsystem 116. User action management subsystem 116 may include software components, hardware components, or a combination of both. For example, user action management subsystem 116 may include software components that access and/or execute programs to store and search for visually scannable codes (e.g., QR codes). Thus, tracking system 102 may generate for display the first action data and the second action data using user action management subsystem 116. In particular, in response to determining that the first visually scannable code has been detected or the second visually scannable code has been detected, tracking system 102 may generate for display the first action data and the second action data. For example, in response to detecting that a customer has scanned a QR code, tracking system 102 may transmit a command to the user device associated with the customer to display the actions associated with the customer.

In some embodiments, tracking system 102 may generate a data file that enables displaying action data. In particular, tracking system 102 may generate a data file that includes interpretable code (e.g., Java code or another type of interpretable code). The interpretable code, when interpreted by an interpreter (e.g., Java interpreter), may cause generating for display the first action data, the second action data, and user data associated with the user. Tracking system 102 may store the interpretable code as a file to be retrieved by scanning the first visually scannable code or the second visually scannable code. For example, each QR code may link to a deep link that contains a Universal Resource Locator (URL) for a microsite. A deep link may refer to a specified custom URL that enables retrieving a particular sub-page of a website. The deep link may be generated based on the action data. The deep link may include a minified URL for a website with a unique code that links to metadata information such as action data. The tracking system 102 may store this deep link. Therefore, when the user scans the QR codes, the user device can direct the user to the intended URL.

In some embodiments, tracking system 102 may use a deep linking service to store and retrieve information associated with different visually scannable codes. In particular, the deep linking services may include two tables. The configuration table may contain the type of deep link (e.g., for generating an offer, prequalification page, etc.), template type (e.g., a type of template to use for generating interpretable code), and template metadata (e.g., field names for data to be requested from the database to build a user interface). The URL table may contain information about each URL, associated deep link type ID (e.g., a string or a number that identifies the deep link), interaction ID (e.g., an identifier of an action that the user and operator have taken such as a test drive), template ID (e.g., an identifier of a template that was used to generate the interpretable code), and other suitable data. When the visually scannable code is scanned, the scan may be fed to the microsite which may read a query parameter associated with the visually scannable code and may make a call to the deep state link service to retrieve all metadata associated with the visually scannable code. If the deep link type is "prequal," the microsite may load the corresponding Pre-qualification interface and pass the deep link data to this interface. In some embodiments, Prequal may be associated with a pre-qualification process, which may indicate whether a user is qualified for financing of a vehicle. That is, the first operator and the second operator may be customer service agents while the user may be a customer.

The Pre-qualification interface may be loaded within the microsite and may be responsible for collecting customer information and initiating the customer pre-qualification process. During the pre-qualification process, the system may make a call to an API (e.g., Leads API) for creating a record or lead associating the received customer information with a customer identifier. Along with the customer data, the sales agent information/code may also be passed to be associated with the newly created lead or record. The Leads API may further create the lead in the dealer Client Relationship Management (CRM) system by sending the lead information in a specifically formatted email. The sales agent information may also flow to the CRM, thereby attributing the lead creation to the specific sales agent.

In some embodiments, the metadata associated with the deep link may contain details about loading the Pre-qualification interface and passing the specific customer service agent's special code. The microsite may get all the data and load the Pre-qualification interface and pass the metadata retrieved from the deep link service along with the sales agent data. This solution may provide a seamless experience for moving from online to the dealership and may enhance the walk-in customer experience by providing tools for self-servicing. The solution may also accelerate the car buying process when walking into the dealership and ensure that the lead record and lead creation in the dealer CRM may be attributed to correct agents.

In some embodiments, tracking system 102 may determine that the user completed a final action via user action management subsystem 116 and update operator records based on the determination of completion. In particular, tracking system 102 may determine that the user completed a final action. Based on determining that the user completed the final action, tracking system 102 may retrieve the first action data and the second action data. Tracking system 102 may determine, based on the first action data and the second action data, a first operator visually scannable code and a second operator visually scannable code, the first operator identifier, and the second operator identifier. Tracking system 102 may update, based on the first action data and the second action data, a first record associated with the first operator and a second record associated with the second operator.

For example, a final action may refer to the customer purchasing the car. Tracking system 102 may determine the customer has purchased the car by receiving an indication that the purchase transaction has been completed. In response to determining the sale is complete, tracking system 102 may search for related user actions. For example, the user may have shown interest in the car and spoken to a service agent on a prior day before purchasing the car. On another day, the user may have taken the car for a test-drive with another service agent. Tracking system 102 may retrieve the action data and the database entries related to these two user actions. After retrieving the action data, tracking system 102 may retrieve the related operator identifier or operator identifiers and the associated operator visually scannable code or codes. In response to determining there was more than one service agent associated with the transaction, tracking system 102 may update the record of the sale into two different records. That is, tracking system 102 may assign credit to the two service agents based on the actions performed. By doing so, tracking system 102 may provide transparency into the sales attribution process, allowing dealerships to monitor sales activity and identify areas for improvement.

In some embodiments, tracking system 102 may update the first record and the second record. In particular, when updating the first record and the second record, tracking system 102 may add a first flag to the first record indicating a first portion of the final action. The first portion may be determined based on the first action data. Tracking system 102 may add a second flag to the second record indicating a second portion of the final action. The second portion may be determined based on the second action data. Components of updating the first record are described further herein with reference to FIG. 5.

FIG. 5 illustrates a data structure 500 used for flagging a visually scannable code. Data structure 500 may include user identifier 502, action data 504, operator identifier 506, visually scannable code 508, first flag 510, and second flag 512. For example, user identifier 502 may refer to the identifier for a user account for the customer. Action data 504 may refer to the details related to the user action. For example, action data 504 may include customer information and details related to the car the customer was interested in purchasing. In some embodiments, action data 504 may include the same data as action data 404. Operator identifier 506 may refer to the identifier for the service agent and their profile. Visually scannable code 508 may refer to the generated QR code for each action data.

In some embodiments, tracking system 102 may determine an update process for the records based on actions corresponding to each operator. That is, tracking system 102 may apportion credit based on the actions that each service agent performed. In particular, tracking system 102 may retrieve a plurality of action identifiers from the first action data and the second action data. Tracking system 102 may determine a ratio between a first set of the plurality of action identifiers and a second set of the plurality of action identifiers. The first set may correspond to the first action data, and the second set may correspond to the second action data. For example, tracking system 102 may retrieve the actions corresponding to each service agent and determine a ratio of these actions (e.g., 3 to 2 or 1 to 2). In some embodiments, the actions may have weights; thus, tracking system 102 may determine a weighted ratio. Thus, tracking system 102 may then generate the first portion based on the ratio.

For example, in response to determining two service agents assisted the customer with the purchase, tracking system 102 may determine the ratio between the two service agents. Tracking system 102 may search for a set of actions related to the customer. In response to finding multiple actions, tracking system 102 may divide the actions into two portions. Each portion corresponds to a specific service agent. After that, tracking system 102 may flag all database entries with the first service agent with the first flag 510 and flag all database entries with the second service agent with the second flag 512. By doing so, the system may accurately attribute sales to the correct service agent, thereby eliminating any ambiguity and ensuring that each service agent is rewarded for their hard work.

In some embodiments, tracking system 102 may assign a visually scannable code to a new user and update each database entry. In particular, tracking system 102 may receive, within the first request, an indication that the user is a new user. Tracking system 102 may assign a new visually scannable code to the user. Tracking system 102 may then update each database entry associated with the user with the new visually scannable code. For example, the service agent may note that a customer is a new user in the action data 202 in the first request. In response, tracking system 102 may generate a new QR code for the new user. For instance, the new QR code may include a link that allows the customer to provide their information. Therefore, tracking system 102 may update any previous database with the new QR code.

In some embodiments, tracking system 102 may link each corresponding visually scannable code to the first visually scannable code. In particular, tracking system 102 may determine that the first action includes a plurality of sub-actions. Tracking system 102 may generate a corresponding visually scannable code for each sub-action of the plurality of sub-actions. Tracking system 102 may link each corresponding visually scannable code to the first visually scannable code. For example, the first action may refer to the customer taking a test-drive. The customer may have called and scheduled the test-drive before visiting the dealership. Therefore, two sub-actions occurred for the first action. Tracking system 102 may link each sub-action with each other.

In some embodiments, tracking system 102 may encode the first action data into the first visually scannable code. In particular, tracking system 102 may encode the first action data into a parameter string representing the first action, the first operator identifier, and a user identifier associated with the user. Tracking system 102 may embed the parameter string into the first visually scannable code. For example, an alphanumeric string may be associated with the customer as a user identifier. A second alphanumeric string may be used for the service agent. The third alphanumeric string may be used for one or more actions. Therefore, the tracking system may generate a string concatenating the three alphanumeric strings. Furthermore, the tracking system may generate a link (e.g., to an application) for the first QR code. The link may include the string enabling access to the application.

Computing Environment

Figure 6:
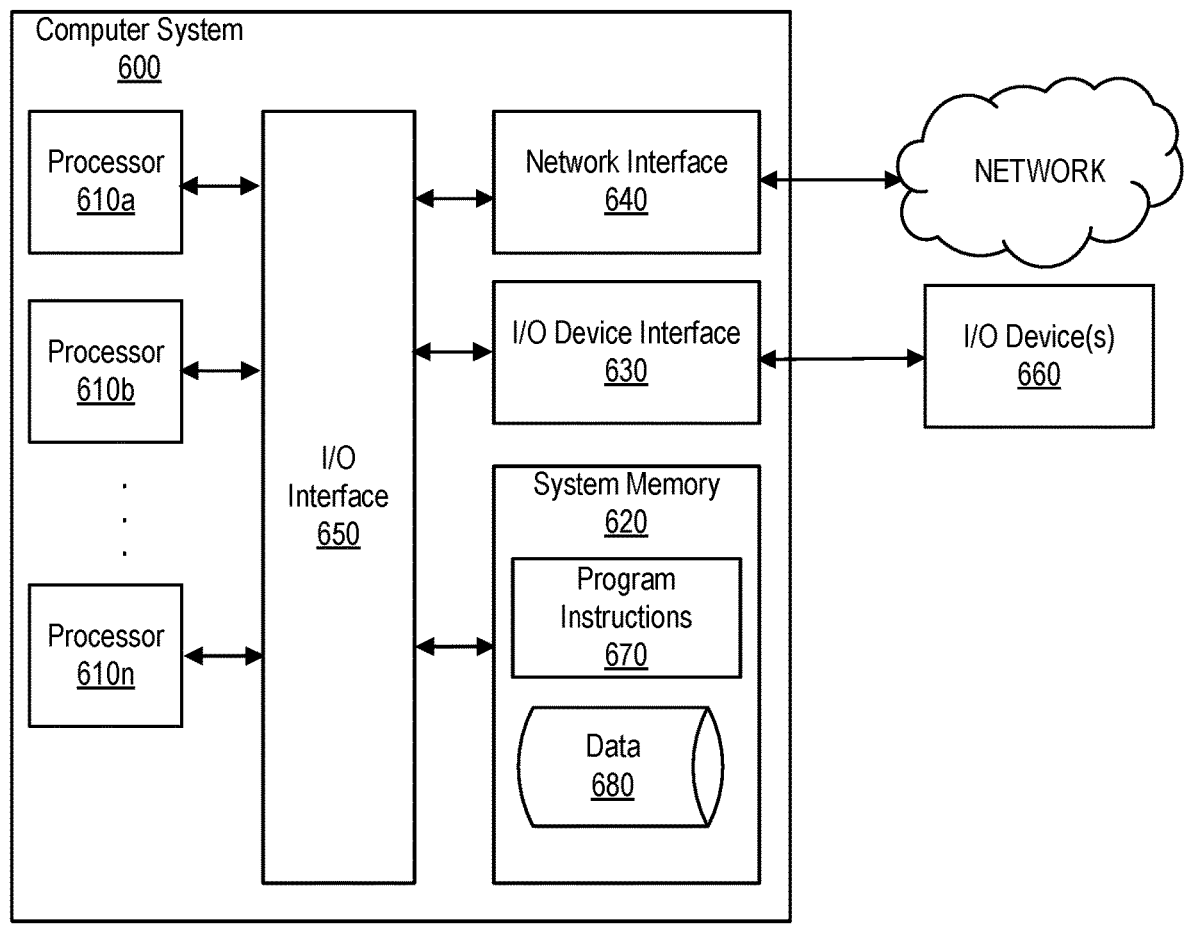
FIG. 6 illustrates a computing device, in accordance with one or more embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a) or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and a network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network such as the Internet, a LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium or multiple media. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Figure 7:
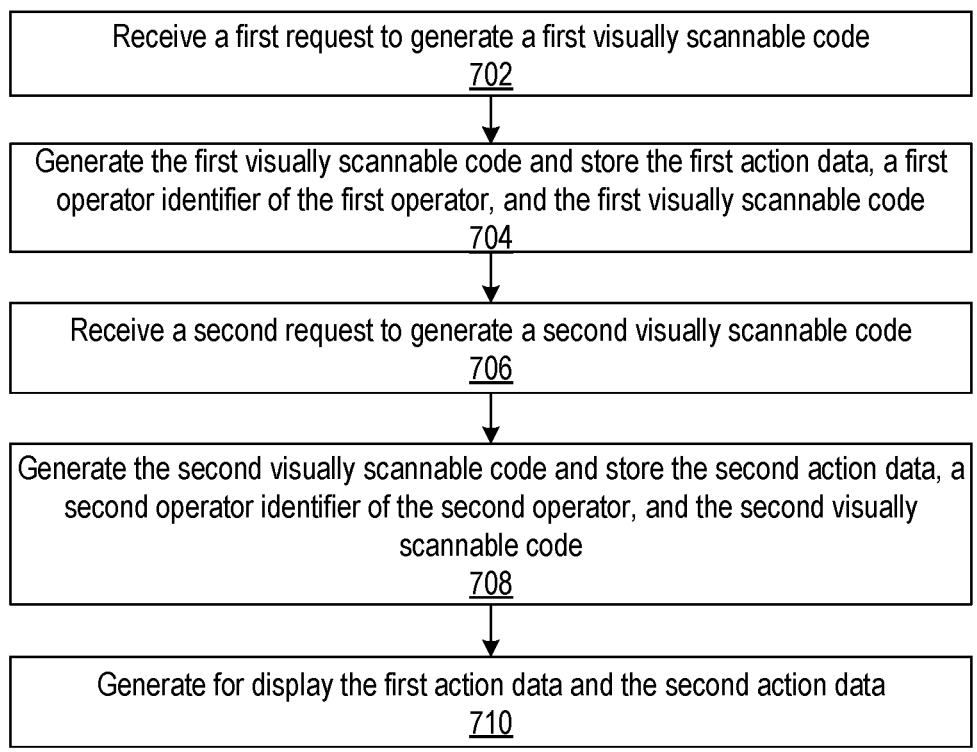
FIG. 7 shows a flowchart of the steps involved in tracking user actions using visually scannable codes, in accordance with one or more embodiments.

FIG. 7 shows a flowchart of the steps involved in tracking user actions using visually scannable codes, in accordance with one or more embodiments. For example, the system may use process 700 (e.g., as implemented on one or more system components described above) in order to track user actions using QR codes.

At 702, tracking system 102 (e.g., using one or more components described above) receives a first request to generate a first visually scannable code. For example, the tracking system 102 may receive a first request to generate a first visually scannable code encoding a first action associated with both a user and a first operator. The first request may include first action data describing the first action. Tracking system 102 may use I/O device interface 630, I/O device 660, and network interface 640.

At 704, tracking system 102 (e.g., using one or more components described above) generates the first visually scannable code and stores the first action data, a first operator identifier of the first operator, and the first visually scannable code. For example, in response to the first request, tracking system 102 may generate the first visually scannable code and store the first action data, a first operator identifier of the first operator, and the first visually scannable code. The first visually scannable code embeds an identifier that enables retrieving the first action data and second action data associated with the user. Tracking system 102 may use I/O device interface 630, I/O device 660, network interface 640, system memory 620, data 680, and processors 610a, 610b, and/or 610n.

At 706, tracking system 102 (e.g., using one or more components described above) receives a second request to generate a second visually scannable code. For example, tracking system 102 may receive a second request to generate a second visually scannable code representing a second action associated with both the user and a second operator. The second request may include the second action data describing the second action. Tracking system 102 may use I/O device interface 630, I/O device 660, and network interface 640.

At 708, tracking system 102 (e.g., using one or more components described above) generates the second visually scannable code and stores the second action data, a second operator identifier of the second operator, and the second visually scannable code. For example, in response to the second request, tracking system 102 may generate the second visually scannable code and store the second action data, a second operator identifier of the second operator, and the second visually scannable code. The second visually scannable code embeds the identifier that enables retrieving the first action data and the second action data. Tracking system 102 may use I/O device interface 630, I/O device 660, network interface 640, system memory 620, data 680 and processors 610*a*, 610*b*, and/or 610*n*.

At 710, tracking system 102 (e.g., using one or more components described above) generates for display the first action data and the second action data. For example, in response to determining that the first visually scannable code has been detected or the second visually scannable code has been detected, tracking system 102 may generate for display the first action data and the second action data. Tracking system 102 may use I/O device interface 630, I/O device 660, and network interface 640.

Figure 8:
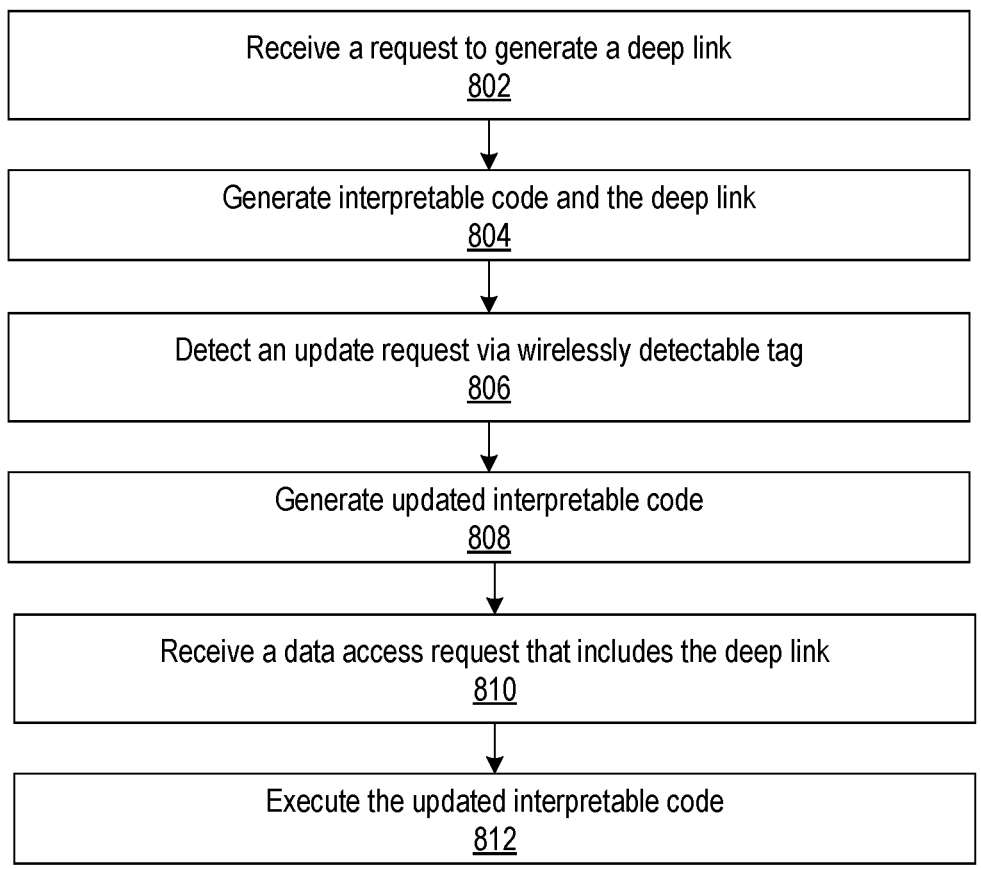
FIG. 8 shows a flowchart of the steps involved in tracking user actions using deep links, in accordance with one or more embodiments.

FIG. 8 shows a flowchart of operations involved in tracking user actions using deep linking. FIG. 8 may support various use cases for deep linking. For example, a user may walk into a dealership and a customer service agent may be able to generate a record for the user which may include a user identifier. The record may be accessible via a generated deep link that may represent the user. The deep link may be encoded into a visually scannable code (e.g., a QR code) or into a wirelessly detectable tag (e.g., a near field communication tag). The tracking system may also embed the customer service agent's identifier into the user's record for credit attribution. In addition, the customer service agent may add, using the tracking system, any actions taken by the user (e.g., a test drive) in association with the dealership. Furthermore, the tracking system may enable generation of a prequalification website or application interface that enables a user to enter information that will then be used to prequalify the user for a specific offer. When the user enters the information into the prequalification website, the tracking system may submit the data for the user to be prequalified. When the prequalification is completed, the tracking system may generate interpretable code indicating prequalification parameters for the user (e.g, how much the user can afford) which may then be retrieved using the deep link associated with the user. The user may then present that deep link when visiting the dealership to show prequalification. When a user buys a vehicle, the system may use the attribution details stored with the user's other data to attribute credit.

As discussed above, the tracking system may be used in a vehicle buying process. For example, tracking system 102 may generate deep links and corresponding code (e.g., for rendering websites, user interfaces, and/or other suitable code). The deep links may enable execution and/or update of computer code (e.g., interpretable code) without needing to specify parameters in the request, thereby, making the process more secure. At 802, tracking system 102 receives a request to generate a deep link. The deep link may be generated for insertion into a wirelessly detectable tag (e.g., a near field tag) or generation of a QR code or another visually readable code. The wirelessly detectable tag may be used to read the deep link and execute interpretable code that links an operator and a user. In certain instances, the dealership may be able to encode the deep link into multiple formats for multiple purposes. For example, the deep link may be encoded into a QR code to be given to user (e.g., on a physical object such as a card). In another example, the deep link may be encoded into a near field communication tag and may be transmitted to the customer's smartphone to be presented at the dealership at another time. In some embodiments, the operator may be a customer service agent at a vehicle dealership and a user may be a customer of the vehicle dealership. As referred to herein, the term wirelessly detectable tag refers to an electronic device that can transmit information (e.g., a webpage link, or another suitable address) that can be received by a receiver (e.g., within a small distance). For example, the wirelessly detectable tag may be a near field communications tag that may be readable within a few inches. In another example, the wirelessly detectable tag may be a Bluetooth transmitter or a Bluetooth beacon that may transmit in the range of several feet (e.g., 30 feet). Thus, a customer previously unknown to the dealership may walk into the dealership and a customer service agent may initiate a process that may onboard the customer into the system. For example, the customer service agent may request that the tracking system generate a deep link for the customer. The deep link when accessed may lead to the customer's information, which may be stored in a database and may be retrieved from the database when the deep link is initiated. Furthermore, the deep link may be encoded into a visually detectable code (e.g., a QR code), a wirelessly detectable tag (e.g., a near field communication tag or a Bluetooth tag), or another suitable format.

When a customer has been added to the system the dealership may give a customer the deep link in a form of a QR code, a card storing a near field communication tag, or in another suitable form. In some instances, a customer may come into a dealership (whether for the first time or not) and may request to test drive a particular vehicle. A customer service agent within the dealership may provide the test drive. When the customer leaves the dealership, the customer service agent may want to generate a record of the customer and the action of the customer and link that customer and the action to the customer service agent's identifier, for example, in order to get credit attribution if the customer buys a vehicle. Thus, tracking system 102 may receive, from a first operator, a first request to generate a near field communication payload that links the first operator and a user (e.g., the case where the customer is known and presents an associated deep link). The first request may include first action data describing a first action (e.g., for test driving the vehicle), a first operator identifier corresponding to the first operator, and a user identifier of the user. If the customer is unknown, the tracking system may first generate a customer record and then generate a deep link encoded into the near field communication payload, QR code, or another suitable medium. Furthermore, the tracking system may call the Leads API and create the lead in a customer relationship management (CRM) system. In some embodiments, a customer service agent at the dealership may present a deep link to a user that brings up a webpage or an application page where the user may register by entering the user's basic information. The system may then generate a lead for the user (e.g., within a CRM system). In addition, the system may generate a deep link for the user with the customer service agent's identifier indicating that the customer service agent interacted with the user.

In some embodiments, the system may also use deep linking technology to setup webpages or application interfaces for employees of the dealership. Thus, a deep link may cause execution of code for rendering a webpage or an application interface by executing code in relation to metadata (e.g., fields) to retrieve from a database. As was discussed above and will further be discussed in this disclosure, the deep link may be encoded into a medium such as a near field communication card, a Bluetooth message, or another suitable medium to be shared with other people (e.g., by handing a card to a person with the encoded deep link, by using near field communication message to send the deep link to a smartphone, etc.). In some instances, the deep link may be represented by a digital avatar that may be downloaded to a user's smartphone or another electronic device. For example, when a wirelessly detectable tag is detected (e.g., via a Bluetooth protocol or via near field communication protocol), a program on a user's smartphone may alert the user (e.g., via an icon) that a deep link is available. The system may then process the deep link, if selected, as described below.

At 804, tracking system 102 generates interpretable code and a deep link. For example, tracking system 102 may in response to the request, generate interpretable code and a deep link for executing the interpretable code. The interpretable code may include a first operator identifier for a first operator and a user identifier for the user. The deep link may also be written into the wirelessly detectable tag. As referred to herein the term interpretable code may refer to computer code that is not compiled but interpreted by an interpreter. For example, Hypertext Markup Language (HTML) code is interpreted code. In another example, Extensible Markup Language (XML) is interpretable code. Although this disclosure discusses the code as being interpretable code, the code may be compiled code or another type of code. For compiled code, the system may store and execute the compiled code. For interpretable code, the system may input the code into an interpreter when executing the code.

In some embodiments, tracking system 102 may generate the interpretable code to link the first operator and the user based on an action that was completed by the user in relation to the operator or by the operator in relation to the user. In particular, tracking system 102 may, in response to the first request, generate interpretable code and a deep link for executing the interpretable code. The interpretable code may link the first operator, the user, and the first action using the first operator identifier and the user identifier of the user. For example, if a customer (e.g., the user) comes into the dealership and test drives a vehicle, the customer service agent (e.g., the operator) may desire to record that action in relation to both the customer and the customer service agent so that the customer service agent may get some credit attribution, if and when, the customer buys a vehicle. Thus, the operator may instruct the tracking system to generate interpretable code (e.g., a webpage or another suitable graphical user interface) that will display the action, the customer service agent's identifier and the customer's identifier. The interpretable code may also be stored in a database together with a corresponding deep link that may be used to access the interpretable code. As referred to herein, the term deep link refers to a type of link that directs users to a specific portion of an application or a website.

In some embodiments, tracking system 102 may also receive a type of interpretable code associated with the deep link. As discussed above, one type may be a generation of a record linking the customer with the customer service agent who performed a test drive with the customer. However, other types of a deep link may be received. For example, a particular deep link may be associated with a prequalification process indicating that the customer is ready to complete or fill out prequalifying forms or paperwork (e.g., for financing or leasing options for the vehicle). Thus, tracking system 102 may retrieve, from the request, a deep link type associated with the deep link. Based on the type of the deep link, tracking system 102 may generate corresponding interpretable code. In particular, tracking system 102 may generate the interpretable code of a first type of a plurality of interpretable code types. The first type may correspond to the deep link type. That is, tracking system 102 may generate interpretable code based on a type associated with the deep link such that the type is retrieved from the request.

In some embodiments, tracking system 102 may perform the following operations when generating the interpretable code. In particular, tracking system 102 may determine, based on the deep link type, a plurality of fields and a plurality of values to be retrieved by the interpretable code. For example, if the deep link type is vehicle offer, tracking system 102 may retrieve fields and corresponding values (e.g., from a database) associated with a vehicle offer. In another example, if the deep link type represents prequalifying process, tracking system 102 may generate a web form (e.g., an HTML form) for the user to enter finance information for prequalifying for purchasing or leasing the vehicle. Tracking system 102 may also add, to the interpretable code, instructions to retrieve the plurality of fields and the plurality of values from a data source. Furthermore, tracking system 102 may add the operator identifier to the form so that the operator (e.g., the customer service agent) may be associated with that form and the customer in order to obtain credit when the customer buys the vehicle. That is, in the example of a prequalifying form, tracking system 102 may add a tag (e.g., HTML or XML) to the generated prequalifying form so that when the form is submitted the processing system (e.g., the CRM system or another suitable system) is able to create a record within which an attribution may be assigned to the customer service agent.

When the deep link has been generated, tracking system 102 may add the deep link into the wirelessly detectable tag. In some embodiments, tracking system 102 may write the deep link into the near field communication payload of a near field communication tag. The near field communication tag may be embedded into an object (e.g., a plastic card, a fob, or another suitable object). In some embodiments, the near field communication tag may be a combination of software and hardware with a mobile device associated with the user. In another example, the wirelessly detectable tag may be an electronic device (e.g., a chip) that is able to transmit a Bluetooth signal or another short-range signal that may be received and decoded by a Bluetooth receiver or another suitable short-range receiver. In some embodiments, tracking system 102 may generate a digital token (e.g., a digital card) and may push that digital token to the user's smartphone. The user's smartphone may store the digital token in a smartphone application such as a digital wallet.

In some embodiments, tracking system 102 may encode the deep link based on the type of protocol supported by the wirelessly detectable tag. In particular, tracking system 102 may encode the deep link into a near field communication payload. The near field communication payload may include the deep link formatted for the near field communication protocol. Tracking system may use a transform encoder (e.g., computer code) to perform the encoding. Tracking system 102 may then write the near field communication payload into the wirelessly detectable tag. As discussed above, tracking system 102 may support different wireless protocols for storing and accessing the deep link (e.g., Bluetooth protocol, near field communications protocol, QR code protocol, and others). Thus, the request may include an indication of the protocol or format. Accordingly, tracking system 102 may encode the deep link into a format compatible with near field communication protocol; and write the deep link when it has been encoded into a near field communication tag of an object. That is, tracking system 102 may encode the deep link into various protocols based on the type of tag into which the deep link is inserted. In some embodiments, tracking system 102 may encode and insert the deep link into different protocols based on the request from the operator.

Turning back to FIG. 8, at 806, tracking system 102 detects an update request to the wirelessly detectable tag. As discussed above, tracking system 102 may use the deep link to update the interpretable code. The update may be requested by the operator that generated the deep link and the interpretable code or by a different operator. Thus, tracking system 102 may detect an update request to the wirelessly detectable tag. For example, a customer service agent may generate an update call which may include the deep link decoded from the wirelessly detectable tag. Thus, the tracking system may query a data structure or a table that stores link data associated with the deep link and may retrieve that data for update or may directly update that data. In some embodiments, the update request may include one or more changes to the interpretable code. In addition, the update request may include the deep link for updating the interpretable code that is associated with that particular deep link. As discussed above, the deep link may be used to access the associated interpretable code and update the interpretable code. For example, the update request may be submitted by a second operator based on another action performed by the second operator. That is, a customer who visited the dealership and test drove a vehicle may come back to the dealership to test drive another vehicle. The customer may present the wirelessly detectable tag to the second operator to indicate the customer already visited the dealership. The second operator (e.g., the customer service agent) may scan the tag to retrieve data associated with the customer (e.g., details of the previous test drive, the identifier of the first operator and/or other suitable data).

The second customer service agent (e.g., a second operator) may help the customer with another test drive and may want to update the details of the second test drive. Accordingly, the second operator may submit the update request to tracking system 102. The update request may include second action data describing a second action associated with the user, and a second operator identifier corresponding to a second operator. Furthermore, the update request may cause the interpretable code to link the user with the second operator. Accordingly, in some embodiments, tracking system 102 may detect an update request to the near field communication tag. The update request may include (1) second action data describing a second action associated with the user, and (2) a second operator identifier corresponding to a second operator. For example, tracking system 102 may update the interpretable code to include both actions taken by the customer and also update the attribution details such that the first action is attributed to the first operator (e.g., customer service agent) and the second action is attributed to the second operator (second customer service agent). In some embodiments, the update may be performed in relation to a database entry that stores information queried by the interpretable code. For example, the attribution data may be added to a database entry which the interpretable code may retrieve.

In some embodiments, tracking system 102 may use the deep link to identify the corresponding interpretable code and retrieve that interpretable code. In particular, tracking system 102 may in response to the update request, retrieve, using the deep link within the near field communication tag, the interpretable code associated with the deep link. For example, the deep link may be a number (e.g., decimal, hexadecimal, et.) a string, or may be generated based on another suitable identifier. The deep link may be stored as a data structure and/or an entry in a database table. The database table may include various fields associated with the deep link.

Excerpt 900 of FIG. 9 illustrates a portion of a data structure (e.g., a database table) storing deep links. In some embodiments, the deep link data structure may include the deep link itself in the form of a unified resource locator (URL), type identifier, and other data as shown in FIG. 9. Excerpt of data structure 920 storing deep link type data may include types of deep links and may be used to build, for example, webpages based on the metadata. For example, a vehicle offer deep link may include data such as dealer identifier, customer identifier (leadid), vehicle identification number and/or other data. Accordingly, tracking system 102 may generate a database entry (e.g., within a database table of data node 104) for the deep link. Furthermore, the tracking system may add, to the database entry, a plurality of fields and values representing the deep link. For example, the database entry may include different fields based on the type of deep link. That is, a deep link representing an offer may have different fields than a deep link representing a prequalification webpage. Furthermore, the values may be stored in a database such that those values may be pulled when the deep link is accessed.

In some embodiments, one of the fields may be an expiration timestamp field for the deep link. The expiration timestamp may indicate when the deep link expires. For example, the expiration timestamp may be checked when the deep link is being used to execute the interpretable code. That is, an operator may create an offer type deep link with an offer for buying a vehicle. The offer may include vehicle price and/or other suitable parameters. However, the operator may wish for the offer to be limited in time. Accordingly, the operator may request that the tracking system generate an expiration timestamp for the offer and add that to the data structure representing the deep link. Accordingly, tracking system 102 may, based on receiving a data access request that includes the deep link, determine, using the expiration timestamp, whether the deep link is still valid. In some embodiments, the deep link representing the offer may be encoded into a QR code, a near field communication tag (e.g., within a card or another object), or into another suitable object that may be sent via mail to a customer. In some embodiments, the deep link may be encoded into a digital card which may be transmitted using a smartphone, a Bluetooth beacon, or another suitable mechanism.

Turning back to FIG. 8, at 808, tracking system 102 generates updated interpretable code. In particular, tracking system 102 may, in response to the update request, generate updated interpretable code based on the one or more changes such that the updated interpretable code may cause a user interface linking the user and the operator to be generated for display. As discussed above, the update to the interpretable code may be requested by a second operator (second customer service agent) to add an action (e.g., an additional test drive) facilitated by the second operator. The original interpretable code may be designed to pull data from a database to generate a webpage indicating the first operator, the second operator and the action. However, the updated interpretable code may cause generation of a display (e.g., a webpage) that includes a first action identifier of the first action, a second action identifier of the second action, the first operator identifier, the second operator identifier, and the user identifier. That is, the updated interpretable code may link both operators (e.g., customer service agents) with the user (e.g., a customer) with both actions (e.g., both test drives) performed by the user.

Furthermore, as discussed above, the interpretable code may be used to generate a prequalification webpage or a prequalification application interface for the user, where the user is able to enter financial information for prequalifying for a loan or a lease. Thus, tracking system 102 may generate a graphical user interface that enables the user to enter user data. In addition, it may be useful to add data to the updated interpretable code that indicates one or more operators that helped the user with buying the vehicle. Accordingly, tracking system 102 may add, to code for the graphical user interface, a first identifier of the first operator and a second identifier of the second operator. For example, the tracking system may add an HTML tag or an XML tag to the prequalification webpage or a prequalification application page so that when the user data is submitted, the operator identifiers are passed for processing together with the user data. Accordingly, in some embodiments, tracking system 102 may generate updated interpretable code based on the second action data and the second operator identifier. The updated interpretable code may cause a user interface that includes a first action identifier of the first action, a second action identifier of the second action, the first operator identifier, the second operator identifier, and the user identifier to be generated for display.

As discussed above, irrespective of whether the interpretable data is updated or not, tracking system 102 may use the deep link to execute the interpretable code. Turning back to FIG. 8, at 810, tracking system 102 receives a data access request that includes the deep link. The data access request may be received based on detection of the wirelessly detectable tag, scanning a QR code, or based on another suitable action. For example, a customer may walk into a dealership for the first time and request a test drive. Based on the test drive, the customer service agent may generate a deep link for the customer indicating actions that the customer took. The deep link may be a link to metadata (e.g., interpretable code) that enables retrieval of parameters (e.g., from a database) associated with the customer's visit. The deep link may then be encoded into one or more formats for the customer service agent and the user. For example, if the customer service agent has near field communication cards that may be given to the customer, the tracking system may encode the deep link into a format supported by the near field communication card and may write the encoded deep link into the memory of the card. In another example, the tracking system may encode the deep link into a QR code, another scannable code or may be transmitted to a user's smartphone (e.g., via Bluetooth or near field communication). Thus, the deep link may be given to the customer in some form. When the customer comes back to the dealership or goes to a different dealership, the customer may provide the deep link to a different customer service agent (e.g., via a smartphone, via a card with an embedded tag, via a QR code, or via another suitable mechanism).

Turning back to FIG. 8, at 812, tracking system 102 executes the updated interpretable code. When the deep link is detected by a device associated with the customer service agent (e.g., the operator), the tracking system may generate a corresponding user interface. In particular, tracking system 102 may, based on receiving the data access request that includes the deep link, execute the updated interpretable code associated with the deep link. For example, the tracking system may render a webpage or an application interface corresponding to the user's action in relation to the dealership.

Figure 10:
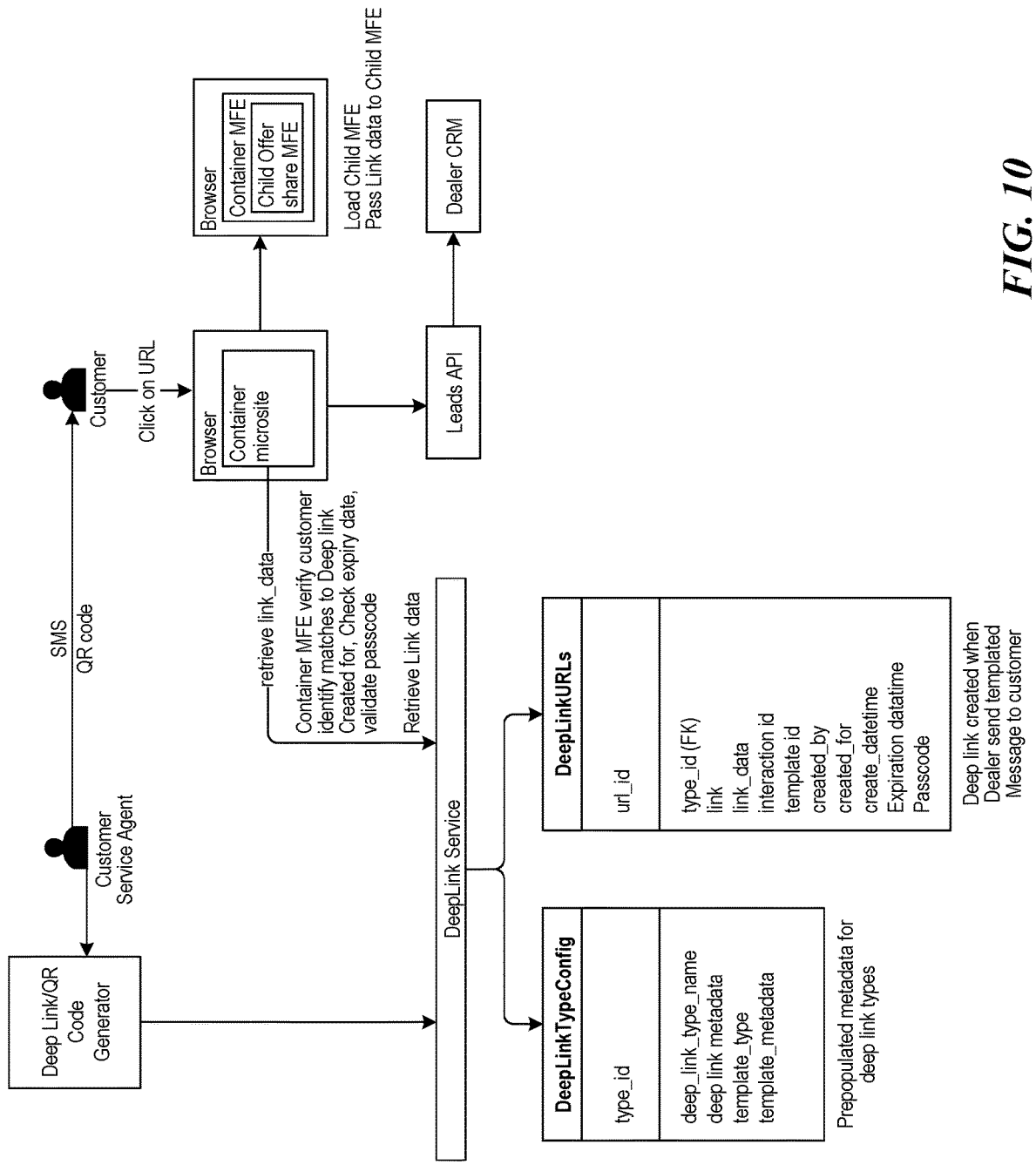
FIG. 10 illustrates a system flow for generating deep links, in accordance with one or more embodiments.

FIG. 10 illustrates a system flow for generating deep links. For example, a customer service agent may request generation of the deep link and a QR code/near field communications code. The request may be sent to the deep link service which may create the deep link with the parameters shown. The deep link may be associated with the customer and the customer service agent may send the deep link (e.g., encoded as a QR code or in another form) to the customer. In some embodiments, the customer service agent may send that encoded QR code via a short message service (SMS). The customer may then use that deep link for various purposes including filling out forms for initial setup, prequalifying for loans, etc. The data may be used by the Leads API to add information to the dealer's CRM system. In addition, the system may create a microsite for the user that may include all the user's data that is needed for purchasing a vehicle (e.g., including prequalifying data, attribution details for customer service agents, etc.).

It is contemplated that the steps or descriptions of FIG. 7 and FIG. 8 may be used with any other embodiment of this disclosure. In addition, the steps and descriptions described in relation to FIG. 7 and FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7 and FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first operator, a first request to generate a first QR code representing one or more first actions associated with both a user and the first operator, wherein the first request comprises (1) first action data describing the one or more first actions and (2) a first operator identifier corresponding to the first operator; in response to the first request, generating the first QR code and storing the first action data, the first operator identifier, and the first QR code in a first database entry corresponding to the user, wherein the first QR code embeds an identifier that enables retrieving the first action data and second action data associated with the user; receiving, from a second operator, a second request to generate a second QR code representing one or more second actions associated with both the user and the second operator, wherein the second request comprises (1) the second action data describing the one or more second actions associated with the user, and (2) a second operator identifier corresponding to the second operator; in response to the second request, generating the second QR code and storing the second action data, the second operator identifier, and the second QR code in a second database entry corresponding to the user, wherein the second QR code embeds the identifier that enables retrieving the first action data and the second action data; in response to determining that the first QR code has been detected or the second QR code has been detected, generating a data structure comprising the first action data, the second action data, and user data associated with the user; and generating for display the data structure on a computing device that scanned the first QR code or the second QR code.

2. A method, the method comprising: receiving a first request to generate a first visually scannable code encoding a first action associated with both a user and a first operator, wherein the first request comprises first action data describing the first action; in response to the first request, generating the first visually scannable code and storing the first action data, a first operator identifier of the first operator, and the first visually scannable code, wherein the first visually scannable code embeds an identifier that enables retrieving the first action data and second action data associated with the user; receiving a second request to generate a second visually scannable code representing a second action associated with both the user and a second operator, wherein the second request comprises the second action data describing the second action; in response to the second request, generating the second visually scannable code and storing the second action data, a second operator identifier of the second operator, and the second visually scannable code, wherein the second visually scannable code embeds the identifier that enables retrieving the first action data and the second action data; and in response to determining that the first visually scannable code has been detected or the second visually scannable code has been detected, generating for display the first action data and the second action data.

3. A method comprising: in response to receiving a first request, generating a first visually scannable code encoding a first action associated with both a user and a first operator and storing first action data describing the first action, a first operator identifier of the first operator, and the first visually scannable code, wherein the first visually scannable code embeds an identifier that enables retrieving the first action data and second action data associated with the user; receiving a second request to generate a second visually scannable code representing a second action associated with both the user and a second operator, wherein the second request comprises the second action data describing the second action; in response to the second request, generating the second visually scannable code and storing the second action data, a second operator identifier of the second operator, and the second visually scannable code, wherein the second visually scannable code embeds the identifier that enables retrieving the first action data and the second action data; and in response to determining that the first visually scannable code has been detected or the second visually scannable code has been detected, generating for display the first action data and the second action data.

4. The method of any one of the preceding embodiments, wherein generating for display the first action data and the second action data comprises: generating a data file comprising interpretable code, wherein the interpretable code when interpreted causes generating for display the first action data, the second action data, and user data associated with the user; and storing the interpretable code as a file to be retrieved by scanning the first visually scannable code or the second visually scannable code.

5. The method of any one of the preceding embodiments, wherein the first request comprises a first operator visually scannable code, and wherein the first operator identifier is determined using the first operator visually scannable code.

6. The method of any one of the preceding embodiments, wherein storing the first action data comprises storing the first action data, the first operator identifier, and the first visually scannable code in a first database entry corresponding to the user, and storing the second action data comprises storing the second action data, the second operator identifier, and the second visually scannable code in a second database entry corresponding to the user.

7. The method of any one of the preceding embodiments, further comprising linking the first database entry and the second database entry based on a user identifier associated with the user.

8. The method of any one of the preceding embodiments, further comprising: determining that the user completed a final action; based on determining that the user completed the final action, retrieving the first action data and the second action data; determining, based on the first action data and the second action data, a first operator visually scannable code, and a second operator visually scannable code, the first operator identifier, and the second operator identifier; and updating, based on the first action data and the second action data, a first record associated with the first operator and a second record associated with the second operator.

9. The method of any one of the preceding embodiments, wherein updating the first record and the second record comprises: adding a first flag to the first record indicating a first portion of the final action, wherein the first portion is determined based on the first action data; and adding a second flag to the second record indicating a second portion of the final action, wherein the second portion is determined based on the second action data.

10. The method of any one of the preceding embodiments, wherein determining the first portion comprises: retrieving a plurality of action identifiers from the first action data and the second action data; determining a ratio between a first set of the plurality of action identifiers and a second set of the plurality of action identifiers, wherein the first set corresponds to the first action data and the second set corresponds to the second action data; and generating the first portion based on the ratio.

11. The method of any one of the preceding embodiments, further comprising: determining that the first action comprises a plurality of sub-actions; generating a corresponding visually scannable code for each sub-action of the plurality of sub-actions; and linking each corresponding visually scannable code to the first visually scannable code.

12. The method of any one of the preceding embodiments, further comprising: receiving, within the first request, an indication that the user is a new user; assigning a new visually scannable code to the user; and updating each database entry associated with the user with the new visually scannable code.
13. The method of any one of the preceding embodiments, further comprising: encoding the first action data into a parameter string representing the first action, the first operator identifier, and a user identifier associated with the user; and embedding the parameter string into the first visually scannable code.
14. A tangible, non-transitory, machine-readable medium storing instructions that, when executed by a data processing apparatus, cause the data processing apparatus to perform operations comprising those of any of embodiments 1-13.
15. A system comprising one or more processors; and memory storing instructions that, when executed by the processors, cause the processors to effectuate operations comprising those of any of embodiments 1-13.
16. A system comprising means for performing any of embodiments 1-13.
17. A method, the method comprising: receiving a request to generate a deep link that links an operator and a user; in response to the request, generating interpretable code and the deep link, wherein the interpretable code comprises a first operator identifier for a first operator and a user identifier for the user, and wherein the deep link is written into the wirelessly detectable tag; detecting an update request to the wirelessly detectable tag, wherein the update request comprises (1) one or more changes to the interpretable code and (2) the deep link for updating the interpretable code associated with the wirelessly detectable tag;
in response to the update request, generating updated interpretable code based on the one or more changes, wherein the updated interpretable code causes a user interface linking the user and the operator to be generated for display; receiving a data access request comprising the deep link; and based on receiving the data access request comprising the deep link, executing the updated interpretable code associated with the deep link.
18. The method of any one of the preceding embodiments, further comprising: retrieving, from the request, a deep link type associated with the deep link; and generating the interpretable code of a first type of a plurality of interpretable code types, wherein the first type corresponds to the deep link type.
19. The method of any one of the preceding embodiments, wherein generating the interpretable code and the deep link comprises: determining, based on the deep link type, a plurality of fields and a plurality of values to be retrieved by the interpretable code; and adding, to the interpretable code, instructions to retrieve the plurality of fields and the plurality of values from a data source.
20. The method of any one of the preceding embodiments, wherein the request comprises (1) first action data describing a first action (2) the first operator identifier corresponding to the first operator, and (3) the user identifier corresponding to the user.
21. The method of any one of the preceding embodiments, wherein the update request comprises (1) second action data describing a second action associated with the user, and (2) a second operator identifier corresponding to a second operator, and wherein the update request causes the interpretable code to link the user with the second operator.
22. The method of any one of the preceding embodiments, wherein the updated interpretable code causes generation of a display comprising a first action identifier of the first action, a second action identifier of the second action, the first operator identifier, the second operator identifier, and the user identifier.
23. The method of any one of the preceding embodiments, wherein executing the updated interpretable code associated with the deep link comprises: generating a graphical user interface that enables the user to enter user data; and adding, to code for the graphical user interface, a first identifier of the first operator and a second identifier of the second operator.
24. The method of any one of the preceding embodiments, further comprising: encoding the deep link into a near field communication payload; and writing the near field communication payload into the wirelessly detectable tag.
25. The method of any one of the preceding embodiments, wherein generating the deep link comprises: generating a database entry for the deep link; and adding, to the database entry, a plurality of fields representing the deep link, wherein the plurality of fields comprises an expiration timestamp for the deep link.
26. The method of any one of the preceding embodiments, further comprising: based on receiving the data access request comprising the deep link, determining, using the expiration timestamp, whether the deep link is still valid.
27. The method of any one of the preceding embodiments, wherein writing the deep link into the wirelessly detectable tag comprises: encoding the deep link into a format compatible with near field communication protocol; and writing the deep link when it has been encoded into a near field communication tag of an object.
28. A tangible, non-transitory, machine-readable medium storing instructions that, when executed by a data processing apparatus, cause the data processing apparatus to perform operations comprising those of any of embodiments 17-27.
29. A system comprising one or more processors; and memory storing instructions that, when executed by the processors, cause the processors to effectuate operations comprising those of any of embodiments 17-27.
30. A system comprising means for performing any of embodiments 17-27.

What is claimed is:
1. A system for tracking user actions using deep links written into near field communication tags, the system comprising:
one or more processors; and
one or more non-transitory, computer-readable storage media storing instructions, which, when executed by the one or more processors, cause the one or more processors to perform operations comprising:
receiving, from a first operator, a first request to generate a near field communication payload that links the first operator and a user, wherein the first request comprises (1) first action data describing a first action (2) a first operator identifier corresponding to the first operator, and (3) a user identifier of the user;
in response to the first request, generating interpretable code and a deep link for executing the interpretable code, wherein the interpretable code links the first operator, the user, and the first action using the first operator identifier and the user identifier of the user;
writing the deep link into the near field communication payload of a near field communication tag;

detecting an update request to the near field communication tag, wherein the update request comprises (1) second action data describing a second action associated with the user, and (2) a second operator identifier corresponding to a second operator;

in response to the update request, retrieving, using the deep link within the near field communication tag, the interpretable code associated with the deep link;

generating updated interpretable code based on the second action data and the second operator identifier, wherein the updated interpretable code causes a user interface comprising a first action identifier of the first action, a second action identifier of the second action, the first operator identifier, the second operator identifier, and the user identifier to be generated for display;

receiving a data access request comprising the deep link; and based on receiving the data access request comprising the deep link, executing the updated interpretable code associated with the deep link.

2. A method for tracking user actions using deep links, the method comprising:

receiving a request to generate a deep link that links an operator and a user;

in response to the request, generating interpretable code and the deep link, wherein accessing the deep link causes execution of the interpretable code that links a first operator identifier for a first operator and a user identifier for the user, and wherein the deep link is written into a wirelessly detectable tag;

detecting an update request to the wirelessly detectable tag, wherein the update request comprises (1) one or more changes to the interpretable code and (2) the deep link for updating the interpretable code associated with the wirelessly detectable tag;

in response to the update request, generating updated interpretable code based on the one or more changes, wherein the updated interpretable code causes a user interface linking the user and the operator to be generated for display;

receiving a data access request comprising the deep link; and based on receiving the data access request comprising the deep link, executing the updated interpretable code associated with the deep link.

3. The method of claim 2, further comprising:

retrieving, from the request, a deep link type associated with the deep link; and generating the interpretable code of a first type of a plurality of interpretable code types, wherein the first type corresponds to the deep link type.

4. The method of claim 3, wherein generating the interpretable code and the deep link comprises:

determining, based on the deep link type, a plurality of fields and a plurality of values to be retrieved by the interpretable code; and adding, to the interpretable code, instructions to retrieve the plurality of fields and the plurality of values from a data source.

5. The method of claim 2, wherein the request comprises (1) first action data describing a first action (2) the first operator identifier corresponding to the first operator, and (3) the user identifier corresponding to the user.

6. The method of claim 5, wherein the update request comprises (1) second action data describing a second action associated with the user, and (2) a second operator identifier corresponding to a second operator, and wherein the update request causes the interpretable code to link the user with the second operator.

7. The method of claim 6, wherein the updated interpretable code causes generation of a display comprising a first action identifier of the first action, a second action identifier of the second action, the first operator identifier, the second operator identifier, and the user identifier.

8. The method of claim 7, wherein executing the updated interpretable code associated with the deep link comprises:

generating a graphical user interface that enables the user to enter user data; and adding, to code for the graphical user interface, a first identifier of the first operator and a second identifier of the second operator.

9. The method of claim 2, further comprising:

encoding the deep link into a near field communication payload; and writing the near field communication payload into the wirelessly detectable tag.

10. The method of claim 2, wherein generating the deep link comprises:

generating a database entry for the deep link; and adding, to the database entry, a plurality of fields representing the deep link, wherein the plurality of fields comprises an expiration timestamp for the deep link.

11. The method of claim 10, further comprising:

based on receiving the data access request comprising the deep link, determining, using the expiration timestamp, whether the deep link is still valid.

12. The method of claim 11, wherein writing the deep link into the wirelessly detectable tag comprises:

encoding the deep link into a format compatible with near field communication protocol to generate an encoded deep link; and writing the encoded deep link into a near field communication tag of an object.

13. One or more non-transitory, computer-readable storage media storing instructions that, when executed by one or more processors, cause operations comprising:

receiving a request to generate a deep link;

in response to the request, generating interpretable code and the deep link for executing the interpretable code, wherein accessing the deep link causes execution of the interpretable code that links a first operator identifier for a first operator and a user identifier for a user, and wherein the deep link is written into a wirelessly detectable tag;

detecting an update request for the wirelessly detectable tag, wherein the update request comprises (1) one or more changes to the interpretable code and (2) the deep link for updating the interpretable code associated with the wirelessly detectable tag;

in response to the update request, generating updated interpretable code based on the one or more changes, wherein the updated interpretable code causes a user interface to be generated for display;

receiving a data access request comprising the deep link; and based on receiving the data access request comprising the deep link, executing the updated interpretable code associated with the deep link.

14. The one or more non-transitory, computer-readable storage media of claim 13, wherein the instructions further cause the one or more processors to perform operations comprising:

retrieving, from the request, a deep link type associated with the deep link; and generating the interpretable code of a first type of a plurality of interpretable code types, wherein the first type corresponds to the deep link type.

15. The one or more non-transitory, computer-readable storage media of claim 14, wherein the instructions for generating the deep link and the interpretable code further cause the one or more processors to perform operations comprising:

determining, based on the deep link type, a plurality of fields and a plurality of values to be retrieved by the interpretable code; and adding, to the interpretable code, instructions to retrieve the plurality of fields and the plurality of values from a data source.

16. The one or more non-transitory, computer-readable storage media of claim 13, wherein the request comprises (1) first action data describing a first action (2) the first operator identifier corresponding to the first operator, and (3) the user identifier corresponding to the user.

17. The one or more non-transitory, computer-readable storage media of claim 16, wherein the update request comprises (1) second action data describing a second action associated with the user, and (2) a second operator identifier corresponding to a second operator.

18. The one or more non-transitory, computer-readable storage media of claim 17, wherein the instructions for executing the updated interpretable code associated with the deep link further cause the one or more processors to perform operations comprising:

generating a graphical user interface that enables the user to enter user data; and adding, to code for the graphical user interface, a first identifier of the first operator and a second identifier of the second operator.

19. The one or more non-transitory, computer-readable storage media of claim 13, wherein the instructions for generating the deep link further cause the one or more processors to perform operations comprising:

generating a database entry for the deep link; and adding, to the database entry, a plurality of fields representing the deep link, wherein the plurality of fields comprises an expiration timestamp for the deep link.

20. The one or more non-transitory, computer-readable storage media of claim 13, wherein the instructions for writing the deep link into the wirelessly detectable tag further cause the one or more processors to perform operations comprising:

encoding the deep link into a format compatible with near field communication protocol; and writing the encoded deep link into a near field communication tag of an object.

* * * * *